Oct. 19, 1937.   W. M. BRADSHAW ET AL   2,096,479
ELECTRIC CIRCUIT TERMINAL ARRANGEMENT
Filed Dec. 31, 1936
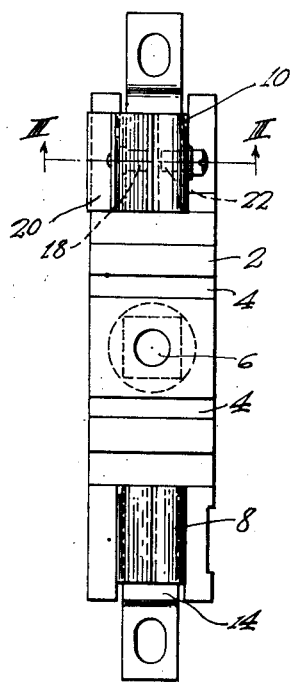
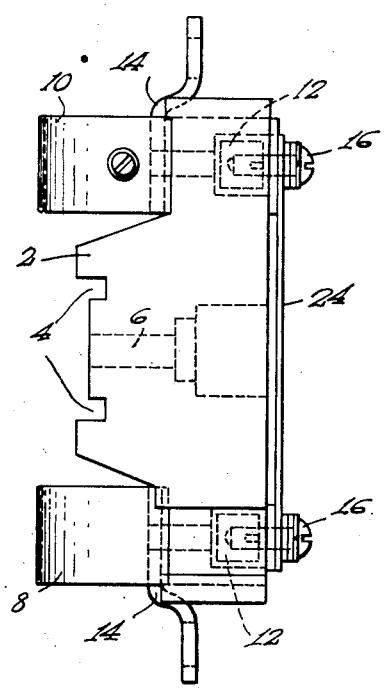
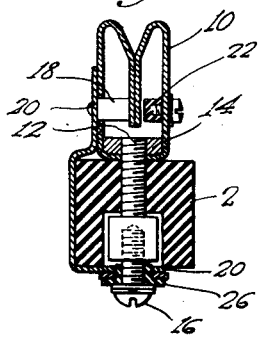
WITNESSES:
INVENTORS
William M. Bradshaw and
Walter G. Mylius.
BY
ATTORNEY Patented Oct. 19, 1937

2,096,479

UNITED STATES PATENT OFFICE 2,096,479

ELECTRIC-CIRCUIT TERMINAL ARRANGEMENT

William M. Bradshaw and Walter G. Mylius, Summit, N. J., assignors to Westinghouse Electric & Manufacturing Company, East Pittsburgh, Pa., a corporation of Pennsylvania Application December 31, 1936, Serial No. 118,589

5 Claims. (Cl. 200—2)

The present invention relates to an electric-circuit terminal arrangement and although capable of broader application is intended primarily for the mounting of a watthour meter of the so-called detachable type, as shown for example in United States Patent 1,969,499, issued August 7, 1934, to W. M. Bradshaw et al.

The detachable type of watthour meter comprises a casing having contact blades projecting from it and connected interiorly of the casing with the watthour meter movement. Such meter is usually mounted on a support having contact jaws thereon connected to the circuit to be metered and adapted to receive the meter contact blades. As shown in the above-numbered patent, the contact jaws are frequently mounted in a base receptacle which, in turn, is secured to a support. In many instances, however, it is desired to mount a plurality of such meters on a panel containing the circuit conductors of a plurality of circuits or upon a box, substantially larger than as shown in the patent, which may contain auxiliary circuit controlling or protective apparatus, test facilities, and the like. In this event, instead of a receptacle, as shown in the patent, a so-called ring socket is employed, as shown generally in patent application, Serial No. 43,343, filed October 3, 1935, by W. G. Mylius. The ring socket is usually secured to a plate which serves to close the panel or box upon which the meter is to be mounted and, as shown in such patent application, terminal blocks upon which the contact jaws are supported may be suspended across the aperture in the ring in a position to facilitate connection with the conductors in the panel or box. It is with this general type of mounting that the present invention is particularly directed.

It is frequently desirable in meters of the detachable type to provide an auxiliary circuit closing device on the meter support which will prevent interruption of the customers' service when the meter is removed for testing, replacement or otherwise. Such auxiliary circuit closer must necessarily become automatically effective to connect the line and load circuits when the meter is withdrawn and, because of the space requirements surrounding the contact jaws which receive the meter blades, it must be compact and of a rugged character to withstand the service to which it is usually subjected. The compactness requirement becomes particularly acute when a polyphase detachable meter is to be mounted on a ring socket because a plurality of terminal blocks or pairs of contact jaws are required to energize the meter movements, and these are all mounted across a socket opening of substantially the same diameter as for the single-phase meter as shown in the aforesaid Mylius patent application.

It is an object of the present invention to provide an improved terminal block assembly for the supporting base or socket of a detachable type watthour meter.

Other objects of the invention will be apparent from the following description and the accompanying drawing, in which Figure 1 is a view in plan of a terminal block constructed in accordance with the present invention.

Fig. 2 is a view in side elevation of the block shown in Fig. 1, and

Fig. 3 is a view in section taken on the line III—III of Fig. 1.

Referring more specifically to the drawing, the terminal block of the invention comprises a block 2 of insulating material having grooves 4 in the upper face thereof to receive flanges depending from a supporting strip or bar from which the block is to be suspended. The block may be secured to the strip or bar by means of a bolt extending through a central aperture 6 formed in the block. The block 4 may be of any desired material having the necessary strength and electrical insulation characteristics, and it has been found in practice that porcelain is a satisfactory material.

Two contact jaws 8 and 10 are secured to the block preferably by means of a screw 12 extending through the block into engagement with a strap 14 extending through the base of the jaw. The strap 14 is provided with an extended apertured portion for receiving a terminal clamp of any desired construction to electrically connect the jaw with an external circuit. In the present instance, the head of the screw 12 is enlarged and counter-sunk into the base of the terminal block, as indicated more clearly in Fig. 3, and is provided with an axial threaded aperture for receiving screws 16 constituting a part of an auxiliary circuit closing device to electrically connect the two jaws of a pair when the meter is withdrawn.

The circuit closing device may comprise an insulating member 18 (Fig. 3) secured to one free end of a leg of the jaw member and extending loosely through the leg for engagement with a strip 20 which resiliently engages such leg. With this construction, when a contact blade is inserted in the jaw, the strip 20 will be forced out of engagement with the jaw leg to break the electrical connection therebetween. In order to make this action as positive as possible, a stop 22 of insulating material is applied to the opposite leg of the jaw to insure that most of the jaw deflection, upon insertion of the blade, will occur on the leg with which the insulating member 18 is associated.

The electrical connection or bridge between the jaws is effected by a conducting strap 24 secured at one end to the head of a screw 12 associated with the jaw 8, by means of a screw 16 with suitable washers. The opposite end of the strap 24 as well as the lower end of strap 20 are provided with registering apertures for receiving an insulating washer 26, as shown more clearly in Fig. 3. A screw 16 extending through such washer into the aperture in the head of screw 12 clamps the free ends of the straps 20 and 24 together in electrical contact, but insulated from the screw 12 by reason of the washer 26.

Of course, the structure shown in Fig. 3 may be applied to both contact jaws 8 and 10, if desired, but usually it is applied to only one.

By reason of the construction described, an unusually compact and efficient terminal block is provided, minimizing space requirements particularly when an auxiliary circuit closing device is needed, and minimizing the required number of parts and factory assembly cost as compared with terminals used previously.

As above indicated, the construction described with specific reference to the mounting for a watthour meter is also capable of wider application, and it is intended that the invention shall be limited only by the prior art and the scope of the appended claims.

We claim as our invention:

1. In an electric-circuit terminal block comprising a block of insulating material having two contact jaws secured to one face thereof with the securing members accessible from another face of said block; a conductor extending between said securing members, a conducting strap resiliently engaging one of said contact jaws and having a free end terminating adjacent to one of said securing members, means for electrically connecting one end of said conductor to the other of said securing members, and means for securing the other end of said conductor and the free end of said strap to the adjacent securing member in electrical contact with each other but insulated from said member.

2. In an electric circuit terminal block including a block of insulating material having two spaced contact terminals secured to one face thereof by securing members extending through the block to be manipulated from another face thereof; a conductor electrically connected to one contact terminal and extending toward the securing member of the other terminal, a conducting strap resiliently engaging the other terminal and extending toward the securing member of said other terminal, and means for electrically connecting the free ends of said conductor and strap to each other and for securing them in insulated relation to the securing member of said other terminal.

3. In an electric circuit terminal block including a block of insulating material having two spaced contact terminals secured to one face thereof by securing members extending through the block to be manipulated from another face thereof; a conductor electrically connected to one contact terminal and extending toward the securing member of the other terminal, a conducting strap resiliently engaging the other terminal and extending toward the securing member of said other terminal, and means for electrically connecting the free ends of said conductor and strap to each other and for securing them in insulated relation to the securing member of said other terminal, said last mentioned means including a screw for extension through aligned apertures in said free ends but out of contact therewith into a threaded aperture in said securing member.

4. In an electric circuit terminal block including a block of insulating material having two spaced contact terminals secured to one face thereof by securing members extending through the block to be manipulated from another face thereof; a conductor electrically connected to one contact terminal and extending toward the securing member of the other terminal, a conducting strap resiliently engaging the other terminal and extending toward the securing member of said other terminal, and means for electrically connecting the free ends of said conductor and strap to each other and for securing them in insulated relation to the securing member of said other terminal, said last mentioned means including a screw for extension through aligned apertures in said free ends but out of contact therewith into a threaded aperture in said securing member, and an insulator extending through said aligned apertures and surrounding said screw.

5. A terminal block comprising a block of insulating material having a recess in one face thereof, a terminal jaw and means for mounting it on another face of the block comprising a screw extending through the block with the head thereof in said recess, a conductor for making circuit connection to said jaw and means for securing it to said block comprising a threaded aperture in the head of said screw, an aperture in said conductor registering with said screw-head aperture, a member extending through the conductor aperture into threaded engagement with the screw-head aperture, and means for insulating the conductor from said member.

WILLIAM M. BRADSHAW.
WALTER G. MYLIUS.